(12) United States Patent
Mann et al.

(10) Patent No.: US 7,795,587 B2
(45) Date of Patent: Sep. 14, 2010

(54) SCANNING IMAGING DEVICE

(75) Inventors: Chris Mann, St. Mawgan (GB); Brian Maddison, Didcot (GB); Jonathan Horton James, Oxford (GB)

(73) Assignee: The Science and Technology Facilities Council, Oxfordshire (GB)

( * ) Notice: Subject to any disclaimer, the term of this patent is extended or adjusted under 35 U.S.C. 154(b) by 752 days.

(21) Appl. No.: 11/659,191

(22) PCT Filed: Aug. 4, 2005

(86) PCT No.: PCT/GB2005/003071
§ 371 (c)(1),
(2), (4) Date: Feb. 2, 2007

(87) PCT Pub. No.: WO2006/013379
PCT Pub. Date: Feb. 9, 2006

(65) Prior Publication Data
US 2009/0212217 A1 Aug. 27, 2009

(30) Foreign Application Priority Data
Aug. 4, 2004 (GB) ................. 0417394.4

(51) Int. Cl.
*G01J 5/02* (2006.01)
(52) U.S. Cl. .................. 250/341.1
(58) Field of Classification Search ........... 250/341.1
See application file for complete search history.

(56) References Cited

U.S. PATENT DOCUMENTS

| | | | |
|---|---|---|---|
| 3,946,234 A | 3/1976 | Hounsfield | |
| 4,056,720 A | 11/1977 | Williams, Jr. et al. | |
| 4,080,633 A | 3/1978 | Starkweather | |
| 4,733,072 A | 3/1988 | Lettington et al. | |
| 5,047,783 A * | 9/1991 | Hugenin | 342/179 |
| 5,307,289 A | 4/1994 | Harris | |
| 5,357,351 A | 10/1994 | Nakajima et al. | |
| 5,712,678 A | 1/1998 | Hofmann | |
| 6,121,983 A | 9/2000 | Fork et al. | |
| 6,242,740 B1 * | 6/2001 | Luukanen et al. | 250/353 |
| 6,587,246 B1 | 7/2003 | Anderton et al. | |
| 2002/0044276 A1 | 4/2002 | Stoner et al. | |
| 2003/0111610 A1 | 6/2003 | Wagenaar et al. | |
| 2003/0189510 A1 | 10/2003 | Anderton et al. | |
| 2004/0051936 A1 | 3/2004 | Watson et al. | |
| 2005/0100866 A1 * | 5/2005 | Arnone et al. | 433/215 |
| 2005/0156110 A1 * | 7/2005 | Crawely | 250/338.1 |

FOREIGN PATENT DOCUMENTS

EP    1 089 548 A2    4/2001

(Continued)

*Primary Examiner*—David P Porta
*Assistant Examiner*—Marcus H Taningco
(74) *Attorney, Agent, or Firm*—Birch, Stewart, Kolasch & Birch, LLP

(57) ABSTRACT

A Terahertz scanning imaging device for imaging objects where the object is larger than the object to imager distance. The imager comprises scanning elements, sensors, and an image processor. The scanning elements are used to direct radiation to the sensors. Multiple scanning elements and sensors may be used, each scanning a portion of the field of view. The image processor, in communication with the sensors, generates a consolidated 2-dimensional image of a field of view.

27 Claims, 3 Drawing Sheets

FOREIGN PATENT DOCUMENTS

| | | |
|---|---|---|
| GB | 2 101 352 A | 1/1983 |
| WO | WO-00/14587 A1 | 3/2000 |
| WO | WO-02/17231 A | 2/2002 |
| WO | WO-03/048815 A1 | 6/2003 |
| WO | WO-03/083508 A1 | 10/2003 |
| WO | WO-03/098741 A1 | 11/2003 |

\* cited by examiner

SCANNING IMAGING DEVICE

The present invention relates to a scanning imaging device and in particular to an imaging device employing an array of sensors. The present invention is particularly suited, but not limited to, imaging at millimeter and sub-millimeter wavelengths.

The ability to generate real-time images has found applications in such diverse fields as security, automated manufacturing processes and the entertainment industry. At visible wavelengths cameras, including CCD cameras, can be used to generate images. A fixed CCD camera is capable of capturing images of the passage of articles or people across the field of view of the camera. However, it is often necessary to generate images of a larger area than the fixed field of view of the camera. In order to do so a scanning CCD camera is used where the array of charge coupled sensors, which form the detector of the camera, is mounted in fixed relationship to its associated optics and both the array of charge-coupled sensors and the associated optics are moved together as the camera is moved so that images of a much larger field of view than the fixed field of view of the camera may be captured. A further example of an imaging system which employs the movement of an array of sensing elements relative to a scanning area is a digital scanner. The multiple sensors of the scanner are generally arranged in a linear array which is swept, as an array, in a single direction across the area to be scanned. In the scanner each individual sensor has its own field of view which is much smaller than the field of view of the scanner as a whole. Thus, as the array is swept across the area to be scanned each individual sensor contributes a strip portion of the overall image produced.

A further known alternative method of scanning an area is to employ a fixed array of sensors in combination with a movable optical element that is common to all of the individual sensors. An example of this is described in U.S. Pat. No. 4,056,720 which employs a rotating mirror to reflect different regions of a large area to an array of sensors as the mirror is rotated. A common scanning system involves the use of two reflective discs which are each rotated about axes which are a few degrees off the normals of the faces of the discs. Radiation incident on the first of the discs is reflected at oblique incidence towards the second rotating disc where the radiation is in turn reflected again. Many different scan patterns of an area can be achieved with this arrangement of two rotating discs, in dependence on the selection of the angles of the axes of the two rotating discs and their rates of rotation.

In so far as imaging at millimeter and sub-millimeter wavelengths is concerned, both fixed and scanning sensor arrays have been devised. Like x-rays these wavelengths are of particular interest in terms of their security applications as they can be used to identify materials that present a security risk which may be hidden under garments or inside containers. For example, in WO03/048815 a portal imaging system is described which employs either fixed or scanning sensors for imaging the interior of containers for the purposes of identifying contraband and illegal immigrants. A scanning system suitable for implementation in the portal imaging system of WO03/048815 is described in WO00/14587. In WO00/14587 a variation on the conventional two disc rotating system is described which folds the optical system. However, even with WO00/14587 the collection optics and the scanning system remains common to all of the individual sensors in the array.

With scanning wavelengths longer than visible wavelengths the focusing optics becomes larger and more cumbersome. Also a separate problem arises where the ratio of the height/width of the object to be imaged and the distance of the object from the imaging device is greater than 1:1 as such an arrangement often requires a more complex optical system for focusing an image of the objection onto the detector. At millimeter and sub-millimeter wavelengths these problems are particularly acute and conventional scanning imaging systems do not adequately address these problems. In particular, time taken to capture an image is directly proportional to the number of detecting pixels in the system. The physical size of each pixel puts severe constraints on the requirements for the optics. For a fixed optical element dimension there is a maximum number of pixels that can be optimally illuminated which in turn leads to a limit to the image capture speed.

The present invention therefore seeks to address some of the disadvantages to be encountered with existing scanning imaging systems and in a preferred embodiment the present invention seeks to provide a scanning imaging system that is capable of capturing images quickly and is suitable for use in environments where the object to be imaged is larger than the distance of the object from the imaging device.

The present invention provides a terahertz scanning imaging device arranged to scan a field of view, comprising: a plurality of sensors arranged to detect terahertz radiation from a plurality of respective portions of the field of view; at least one scanning element arranged to direct terahertz radiation from a respective portion of the field of view onto the corresponding sensor; and an image processor in communication with the sensors for generating a consolidated image of the field of view.

The portions of the field of view may be discrete, or there maybe some overlap between the portions. When the consolidated two-dimensional image of the field of view is formed by the image processor, any overlap may be removed to form a spatially continuous image.

In preferred embodiments the device includes a plurality of scanning elements, each element arranged to scan one of the portions of the field of view onto its respective sensor.

In an alternative arrangement, a single scanning element is used to direct radiation from a plurality of portions of the field of view onto a corresponding plurality of sensors.

Further embodiments may provide a terahertz scanning imaging device wherein each scanning element is mounted for movement to scan across the field of view in two dimensions, for example by means of two rotational degrees of freedom, one rotational and one translational, or two translational degrees of freedom. Where two rotational degrees of freedom are used, the axes of rotation may intersect.

In a particular embodiment the invention provides a scanning imaging device comprising a fixed array of imagers and an image processor, the array of fixed imagers being in communication with an image processor for generating an image of the field of view of the scanning imaging device on the basis of image data generated by said fixed imagers, said array of fixed imagers comprising a plurality of sensors that are fixed with respect to said field of view and a respective plurality of scanning elements, each scanning element being arranged for directing radiation from a portion of said field of view to its respective sensor, each scanning element being mounted for movement in first and second directions for scanning its respective sensor across said portion of said field of view in corresponding first and second scanning directions whereby each fixed imager generates image data relating to its respective portion of said field of view.

Preferably, the array of fixed imagers is connected to the image processor so as to communicate image data from a plurality of the fixed imagers in parallel. Also, preferably at least one of the first and second movement directions of each scanning element comprises rotation about an axis and ideally the first and second movement directions of the scanning elements are orthogonal to provide a linear scan output that can be easily transferred to a video output.

In a preferred embodiment said plurality of scanning elements comprises a plurality of reflective elements in the form of plane mirrors and a corresponding plurality of collimators are provided, each collimator, such as a parabolic mirror, being arranged in fixed relation to a respective sensor and being adapted to collimate images from a respective scanning element onto its respective sensor. The scanning imaging device may also comprising a rotation drive for controlling rotation of said plurality of scanning elements which may be in the form of an electric motor, such as a stepper motor, or a piezoelectric drive member and preferably first and second rotation drives are provided to control rotation about said first and second axes respectively. More preferably, at least one of the first and second rotation drives is common to two or more of the scanning elements.

Ideally, each of said scanning elements is adapted to scan a plurality of different selectable portions of the field of view and adjacent fixed imagers may generate image data for portions of the field of view which overlap along one edge.

In a preferred embodiment the plurality of sensors are tuned to detect radiation at millimeter or sub-millimeter wavelengths. Also, the plurality of sensors may comprise at least first and second groups of sensors with each group of sensors being tuned to detect radiation at a wavelength different from the other group or groups of sensors.

An embodiment of the present invention will now be described by way of example with reference to the accompanying drawings, in which.

Figure 1:
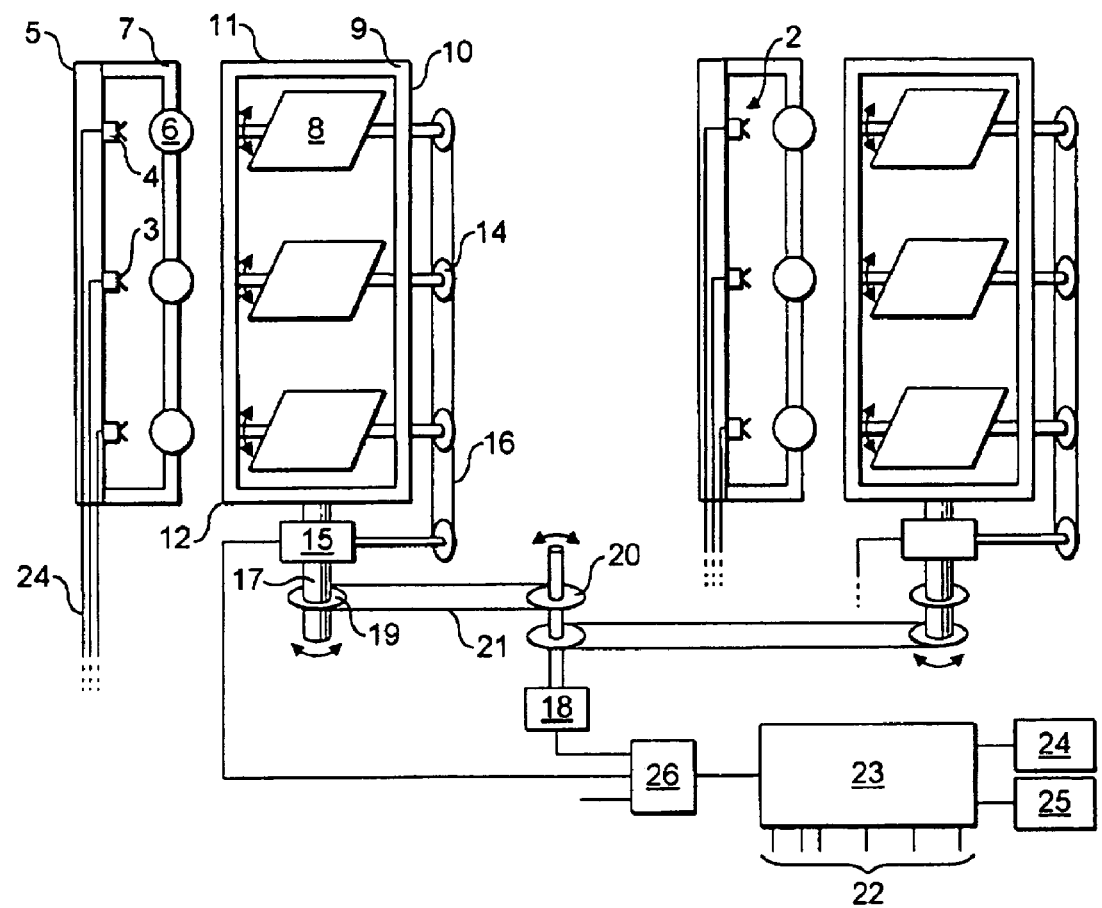
FIG. 1 is a schematic diagram of a scanning imaging device in accordance with the present invention.

The scanning imaging device of FIG. 1 generally comprises an array of fixed imagers which includes an array of fixed sensors, a respective array of collimating optics and a respective array of two-axis, steerable, plane reflectors. In the illustrated embodiment six sensors 2 are arranged in two substantially parallel linear arrays of three sensors each. The sensors 2 of FIG. 1 comprise terahertz antenna arrays 3 with associated signal collection and amplification circuitry 4. Each group of three sensors 2 of each linear array is secured on a column 5 with each sensor 2 at a predetermined position substantially equidistant from its neighbouring sensor or sensors. The sensors are fixed with respect to the field of view of the imaging device.

Each group of three sensors is provided with a respective linear array of collimating optics in the form of three parabolic mirrors 6 each of which is mounted in a predetermined fixed position in relation to the antenna array 3 of its respective sensor 2 so as to optimise the coupling of the parabolic mirror 6 with the antenna array 3. In the illustrated preferred embodiment the support 7 for the linear array of parabolic mirrors 6 is secured to the column 5 so as to maintain the fixed spatial relationship between the parabolic mirrors and their respective sensors.

Each of the sensors 2 also has associated with it a respective two-axis, steerable, reflective element 8 such as a plane mirror so that for each linear array of three sensors 2 there is provided a corresponding linear arrangement of three mirrors 8. Each set of three mirrors 8 is mounted within a frame 9. The frame 9 comprises two substantially parallel side members 10 connected together at each end by upper and lower cross members 11 and 12 respectively. Thus, in FIG. 1 the frame 9 describes an open generally rectangular structure, although other shapes or the frame 9 are also envisaged.

Extending across the frame 9 are three shafts 13 each of which is mounted for rotation within the frame 9 and supports one of the plane mirrors 8. The plane mirrors 8 are fixed secured to their respective shaft 13 and so are adapted to rotate with the shaft 13 within the frame 9. Hence, the first axis of rotation of each of the plane mirrors corresponds to the axis of rotation of the shafts 13 which, in FIG. 1, corresponds to an axis of rotation extending left to right across FIG. 1. A first end of each shaft is mounted on one or more bearings (not shown) in an associated blind hole provided in the frame 9 so as to permit relative rotation of the shaft with respect to the frame. The opposite end of each shaft extends through the frame 9, again preferably supported by one or more bearings, and terminates with a toothed wheel 14 (for the sake of clarity the teeth of each wheel have been omitted from the drawings). The three shafts, each mounted within the same frame 9, are provided with a common drive in the form of a first rotation drive such as an electric motor 15 which drives each of the shafts by means of a common cogged belt 16. Thus, the output shaft of the first motor 15 is provided with a toothed wheel 14, similar to those provided at the ends of each of the shafts 13 and the toothed wheels 14 of both the first motor 15 and the shafts 13 are in engagement with the continuous loop of the cogged belt 16.

In addition, the frame 9 is fixedly mounted on a rotatable supporting shaft 17 which is arranged to cause rotation of the frame about an axis perpendicular to the axes of rotation of the shafts 13 (a vertical axis in FIG. 1). The first motor 15 is also fixedly mounted either to the frame 9 or directly to the supporting shaft 17 (as illustrated) so that the first motor 15 is caused to rotate with the frame 9. Rotation of the supporting shaft 17 is driven by means of a second electric motor 18 which is connected to the supporting shaft 17 by means of a pair of toothed wheels 19, 20 and a cogged belt 21 linking the toothed wheels.

Use of a cogged belt for driving the two-axis rotation of the plane mirrors simplifies the control and monitoring of the position of the steerable mirrors with respect to the image data generated by their respective fixed imager. Alternatively, stepper motors may be employed or other rotational drive elements such as, but not limited to, piezoelectric drive elements, preferably in combination with a position transducer, to control and monitor the positions of the mirrors.

In this way each steerable mirror 8 is mounted for two-axis rotation with both axes of rotation lying in the plane of its respective frame 9: the first axis of rotation extending parallel to the upper and lower cross members 11, 12 of the frame and the second axis of rotation extending parallel to the side members 10 of the frame 9. Furthermore, each of the sensors 2 is positioned so as to be aligned, via its respective parabolic mirror 6, with the point of intersection of the two axes of rotation of its respective steerable mirror 8. As the field of view of each sensor 2 lies on the common axis of rotation of each two-axis steerable mirror 8, partial rotation of both shafts 13, 17 results in a complete mapping of the field of view of each sensor and combining the image data from each sensor 2 results in a complete mapping of the field of view of the imaging device. It will be apparent, therefore, that the shafts 13, 17 are not required to be capable of turning through 360°. Instead the shafts are only required to rotate through less than 90°, for example 60° and more preferably 45°, to scan the selected field of view of the sensor 2. In a preferred embodiment, described in greater detail below, it is envisaged that the sweep of the mirror may be adjustable.

Figure 2:
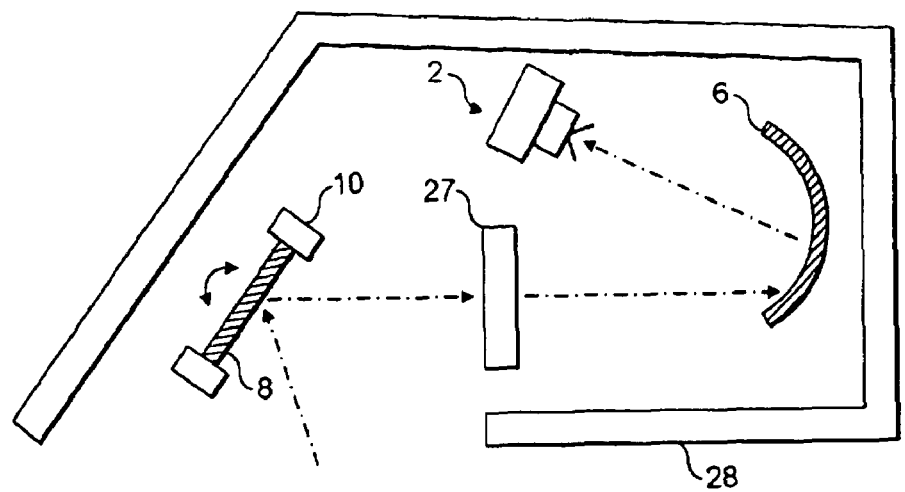
FIG. 2 illustrates the relative positions of the optical elements forming the scanning imaging device of FIG. 1.

FIG. 2 provides an alternative schematic view of the scanning imaging device of FIG. 1, illustrating the relative positions of the optical elements forming the fixed imager. It will, of course, be apparent that the two-axis steerable plane mirror 8 must be positioned so that radiation from the object to be imaged is incident on the mirror at an acute angle to the reflective surface of the mirror, and that this remains true for all positions of the mirror during scanning. This results in the sensors 2 being positioned so as not to face towards the field of view of the imaging device. This arrangement happens to provide the additional benefit of the physical depth of the scanning imaging device being reduced in comparison to conventional scanning systems.

In the fixed imager illustrated in FIG. 2 a polariser 27 is included between the steerable mirror 8 and the parabolic mirror 6. The polariser 27 is an optional feature which assists in reducing noise in the image signal collected by the sensor 2. For outdoors imaging the polarisation of the incident radiation will vary in dependence on the position of the sun in the sky. To optimise coupling, therefore, the polariser and the sensor may be rotated to optimise the signal level observed. The system of FIG. 2 also includes shielding 28 which is provided to further reduce noise in the signals generated by the sensor 2. This shield may be cooled to provide increased detected signal contrast by reducing the parasitic radiation content seen by the sensor 2. However, with appropriately designed optical elements in conjunction with matched antenna arrays 3, little radiation other than that from the sub-field of the view of the sensor should be detected reducing the need for full shielding of the scanning imaging device.

Although the mirrors 8 illustrated in FIGS. 1 and 2 are plane mirrors, it is envisaged that other shapes of reflective elements including concave and elliptical mirrors may be employed, as necessary. Furthermore, the mirrors may be replaced by lens. However, at terahertz frequencies, in particular, mirrors are preferred as they are significantly less lossy (and therefore emits less) than a lens.

Although each sensor may have a single antenna, in order to reduce the overall object mapping time, each sensor preferably uses a linear array of antennas at the focal plane of the optics. This extends the instantaneous field-of-view and reduces the front scanning angular range therefore allowing large zones of the object to be mapped in a given time or longer exposure time for signal-to-noise improvement. However, the use of off-axis detecting elements at the focal plane is affected by degradation of the image quality for the edge pixels of the array; this can be compensated by further shaping of the optical elements in front of the array (additional small-amplitude optimised deformation of the initial parabolic mirror surface). In the case of millimeter and sub-millimeter wavelengths, the individual antennas of each sensor are preferably spaced apart by approximately 5-3 mm.

The data generated by each of the sensors 2 is output to the data input ports 22 of an image processing unit 23 (one data input port for each of the six sensors is illustrated in FIG. 1). The input ports 22 are connected to the outputs of the sensors 2 by means of data lines 24 which, for the sake of simplicity, are not fully illustrated. Where the image processing unit 23 includes conventional desktop processor hardware, the data input ports 22 may be provided, for example, by means of dedicated serial ports or LAN connection. The image processing unit 23 is also in communication with one or more output devices such as, but not limited to, a monitor 24 and is in communication with one or more input peripheral devices such as, but not limited to, a keyboard 25 or a mouse.

The image processing unit 23 is also in communication with a drive control 26 which is, in turn, in communication with the motors 15, 18. The drive control 26 manages actuation of the motors 15, 18 and hence controls the motion of the mirrors 8. Thus, by means of the drive control 26 the image processing unit 23 synchronises the image data received from the sensors 2 with positional information with respect to the field of view of each of the sensors at the time the image data was collected. The positional information may be determined by the image processing unit predictively with respect to timing instructions output by the image processing unit 23 to the drive control 26 and/or is preferably determined with respect to feedback data generated by the drive control 26 with respect to the motors 15, 18 and/or measured positions of the mirrors 8.

The image processing unit 23 includes image processing software for analysing the image data collected from each of the sensors 2 with respect to positional information and for combining the image data from each of the sensors to construct a single image encompassing the individual sub-fields of view of all of the fixed imagers. The single image produced by the image processing unit 23 may then be output for example to the monitor 24 for viewing by a user of the scanning system.

Figure 4:
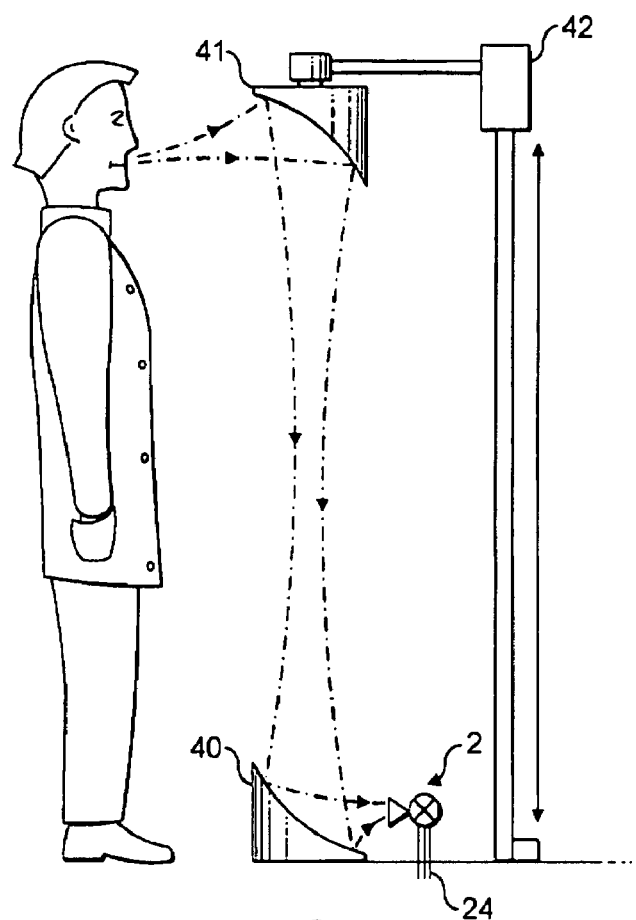
FIG. 4 illustrates an alternative scanning imaging device in accordance with the present invention.
Figure 5:
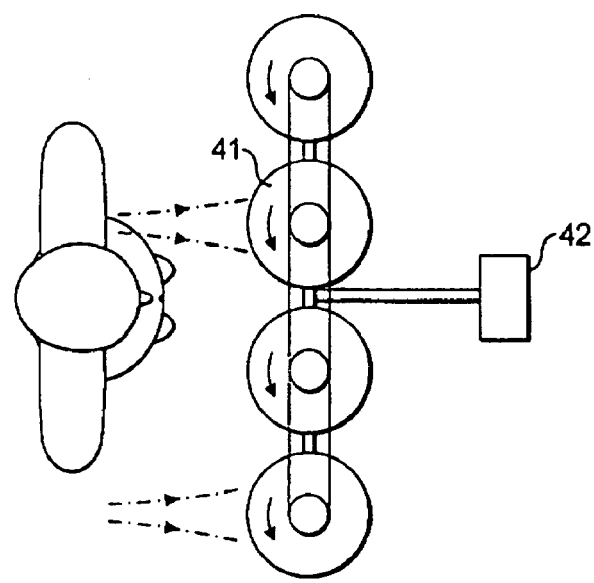
FIG. 5 is a view from about of the scanning imaging device of FIG. 4.

A second embodiment of a scanning imaging device is shown in FIGS. 4 and 5. In this configuration the imager has an array of fixed imagers consisting of a row of fixed imagers (four are illustrated in FIGS. 4 and 5) arranged substantially parallel with each other so as to image in a vertical plane. Such a configuration of fixed imagers is desirable when imaging a tall slender object such as a person. Each fixed imager preferably consists of plurality of fixed detectors 3 arranged in a horizontal row. The fixed detectors 3 are positioned on the principle optical axis of a fixed respective parabolic mirror 40 at the base of the device and a respective vertically movable parabolic mirror 41 that is mounted on a carriage 42 which permits movement of the movable parabolic mirror 41 in a vertical direction from the bottom to the top of the imaging plane and rotation about the principle optical axis. The fixed detectors 3 collect image data for communication to an image processor (not illustrated) on data lines 24 for constructing an image of the complete field of view of the scanning imaging device.

The principle of operation of this alternative scanning imaging device is set out below. The fixed parabolic mirror 40 is used to collect a circular cross section collimated beam aligned with the vertical plane in which the movable parabolic mirror 41 travels. The movable parabolic mirror 41 generates the collimated beam from a focused spot on the object to be imaged. The vertically movable parabolic mirror 41 is positioned such that its focus is approximately 0.5 meters from the mirror. Each fixed imager therefore collects image data relating to a vertical strip of the final image upon the movement of each movable parabolic mirror 41 in the vertical plane. The vertical image strips generated by each of the fixed imagers are not adjacent and do not overlap each other. Instead, each vertical image strip is separate from the image strips generated by adjacent fixed imagers and the space in between each of the image strips represents regions of the field of view still to be imaged.

Each movable parabolic mirror 41 is also configured such that via a stepper motor drive (not illustrated) it is rotatable about the optical axis of the beam between the fixed and movable parabolic mirrors which is also conveniently arranged so that it is parallel to the linear axis of movement of the movable parabolic mirror 41. The focus of the movable parabolic mirror 41 lies on an optical axis between the mirror and the object to be imaged which is preferably substantially perpendicular to the linear motion of the mirror. In this way during rotation of the movable parabolic mirror 41 the focus of the mirror may be maintained at substantially the same vertical height. Hence, after each vertical translation of the movable parabolic mirrors 41 the movable parabolic mirrors 41 are rotated a predetermined number of degrees about the principle optical axis so that new image data for an adjacent vertical strip may be collected by repeating the movement of the parabolic mirrors 41 in the vertical plane. This procedure is then cyclically repeated until images for vertical strips generated by adjacent fixed imagers, but in different cycles, overlap. The image processor which receives the image data from each of the fixed detectors 3 then combines the vertical image strips into an overall image of the field of view of the scanning imaging device.

The speed of the image capturing process is greatly increased in comparison to a side detector raster scan, by using a horizontal array of X detectors in the imaging plane of the fixed parabolic mirror. For each vertical translation of the movable parabolic mirrors, X adjacent strips of the image are retrieved. The movable parabolic mirror is then rotated an angle equivalent to the total wide of the image strips of the individual detectors to then retrieve X new strip images. In this way the speed of image capture is increased by a factor of X. If an array of Y fixed imagers each having X detectors is implemented in the manner described above, the total time required for the image to be captured by the scanning imaging device is a factor of X·Y faster in comparison to the total capture time that would be required for a side detector raster scanned over the image plane.

A potential problem with this arrangement arises from those fixed detectors positioned further from the principle optical axis of the fixed parabola in combination with rotation of the movable mirror off-axis. The imaging point of a detector on the extreme edge of the array will no longer lie on the same plane as the centre pixel. This effect can either be corrected for in the imaging software to correct for the misplacing of in the image reconstruction. Alternatively, the fixed parabola can be simultaneously rotated with the top movable parabola so that all the pixels remain on the primary optical axis.

As the overall field of view of the scanning imaging device is divided into individual sub-fields of view for which parallel input of image data is envisaged, an image of the overall field of view can be generated within a few seconds. Indeed, a 0.5 $m^2$ object can be scanned in around 5 seconds and in the case of millimeter and sub-millimeter radiation is capable of images at 5 mm resolution after signal & image processing.

In a preferred embodiment the image processing unit 23 utilises the overlap of the sub-fields of view of individual sensors to confirm alignment of the images recorded by the sensors. For example, where the sensors are arranged for a partial overlap, the image data specific to an edge region common to the first and second sub-fields of view of respective first and second adjacent sensors may be compared by the image processing unit 23 to confirm identity between the image data from the first and second sensors as a data parity check.

FIG. 1 shows a scanning imaging device that for simplicity uses mechanically synchronised steerable mirrors that employ motors that are common to a group of mirrors. However, each mirror may be independently driven by its own rotation drive. With this alternative arrangement software configurable scanning configurations can be realised. In particular, if the maximum sub-fields of view of each fixed imager are allowed overlap, it is possible to perform an approximate zoom function by selecting an overlapping scanning region for adjacent detectors. Thus, the scanning imaging device can be used to quickly and selectively analyse more closely individual sub-fields of view, where an item of interest is identified. By careful selection of the overlapping sub-fields of view it is also possible to further improve signal-to-noise ratio. It is also possible to use overlapping sub-fields of view to generate stereoscopic image information with respect to the positions of each detector relative to the person or object being imaged. Selection of data from individual detectors and/or selection of individual sub-fields of view for scanning by a selected detector(s) are preferably inputted to the image controller by means of the input peripherals 25.

Figure 3:
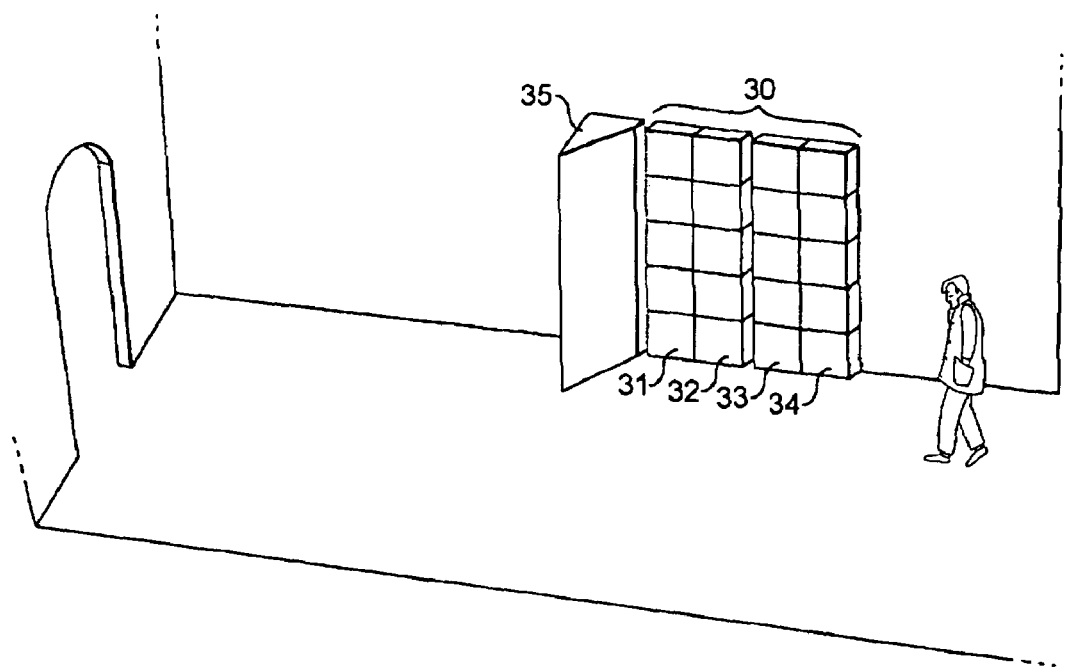
FIG. 3 illustrates a terahertz scanning security installation in accordance with the present invention.

The scanning imaging device illustrated in FIG. 1 is particularly suited for use in the identification of concealed weapons and/or hazardous material at transport terminals such as airports. In FIG. 3 a scanning imaging device, operable at terahertz frequencies, is illustrated. The scanning terahertz imaging device 30 is mounted on a wall and comprises four, vertically arranged, linear arrays of sensors 31, 32, 33, 34 with each array comprising five sensors. The number and dimensions of the sensor arrays is chosen to be sufficient to image a field of view in excess of the width and height of a person standing.

As illustrated, the linear arrays of sensors and their associated steerable mirrors are positioned behind a screen which is substantially transparent to terahertz radiation but is preferably substantially opaque at visible wavelengths. The scanning terahertz imaging device 30 may be positioned on the wall of a corridor through which passengers must transit to reach the departure gates, as illustrated. Alternatively, the scanning terahertz imaging device 30 may be provided at security check points within the transport terminal, for example where x-ray machines are currently employed. In which case the scanning terahertz imaging device 30 may be provided as a free-standing screened unit in front of which passengers are required to stand momentarily both facing towards and away from the screen, as part of normal security procedures. As a result of the optical arrangement employed in the scanning imaging device and employing a steerable plane mirror having an effective diameter of between 8-12 cm (i.e. entrance pupil diameter between 7 and 10 cm), it is possible to produce an image of a person (approx. 1.5 m-2.0 m height) when standing close to the scanning device, e.g. $\approx$200 cm or less. This employs a telescope (i.e. finite-infinite) optical configuration which gives large (quasi-infinite) depth-of-field. This allows the system to be tolerant to the exact device to object distance. On the other hand, an object further away will be seen with reduced resolution. In case the object is closer than the nominal design distance, the fixed imagers of the scanning device can be translated axially to compensate for the image defocus (near-field effect). For optimal optical signal coupling with the antenna array, fast focussing optics is used, leading to depth-of-focus in the range of 2-5 mm at millimeter wavelengths, which is easily manageable and achievable with standard linear translation stage. This arises from the fact that the depth of focus of the scanning terahertz imaging device described herein is less than that of conventional terahertz scanning systems and is achieved using simpler optical components.

For the case of terahertz imaging at close range i.e. object at ~50 cm from the device, and based on a nominal resolution of ~5 mm, the entrance pupil diameter is in the range 20-30 cm diameter at millimeter wavelengths and 10-20 diameter at sub-millimeter wavelengths, due to focal ratio F~2 and F~4 for both spectral range respectively. With this arrangement the scanning imaging device would have a depth-of-field of approximately 10 mm. The scanning device in this configuration needs a finite-finite conjugate optical system via a (off-axis to avoid signal loss from central obscuration) Gaussian beam telescope either based on a minimum of 2 parabolic mirrors or 2 confocal ellipsoidal mirrors. The parabolic option offers an intermediate pupil plane for eventual spectral splitting (multi-wavelengths application) while the ellipsoids approach provide a natural implementation of an intermediate field stop for improved radiometric performance at the expense of a reduced field capability (i.e. reduced size of linear array at focal plane without degradation).

The scanning terahertz imaging device 30 may be set up to detect natural background terahertz radiation or alternatively the scanning terahertz imaging device 30 may include a terahertz source 35 for illuminating people or baggage to be scanned with terahertz radiation. In the case of passive radiation scanning, preferably the scanning terahertz imaging device 30 is positioned facing towards a surface that is highly reflective to terahertz radiation. In this way people (who are absorbers of terahertz radiation) standing between the scanning imaging device 30 and the highly reflective surface are imaged as a dark feature on a brightly illuminated background. In a further alternative, each detector may be provided additionally with a noisy source of terahertz radiation. Such a source of radiation could be an optical light source filtered to remove the optical content and pass the terahertz component. The terahertz source is aligned with the optical arrangement of the collimator and the steerable plane mirror so as to illuminate people standing in front of the imaging device as well as capturing images of those people when illuminated. Care must be taken to ensure that noise does not leak directly from the source into the sensor 2.

Furthermore, the scanning imaging device need not be restricted to imaging at a single predetermined wavelength. Individual sensors may be tuned to detect different wavelengths so that a multi-wavelength image may be produced. In a preferred embodiment, the linear array of sensors may be replaced by a linear array of pairs or sets of sensors, with each sensor within a set tuned to a different wavelength and with all sensors within a set imaging substantially the same sub-field of view. With this embodiment image data for the same sub-field of view at different wavelengths may be directly compared by the image processing unit 23 to identify materials and compounds in relation to their characteristic radiation absorption at the different imaging wavelengths. The use of multiple wavelengths is of particular benefit in the chemical, biochemical and food industries.

At millimeter and sub-millimeter wavelengths preferably the individual fixed imagers are spaced between 30 and 80 cm apart, more preferably 50 cm apart, whilst still being capable of scanning individual sub-fields of view which combine to provide a continuous single image or which partially overlap at the edges of the sub-fields of view.

Of course, as the scanning imaging device described above comprises linear arrays of fixed imagers, it is particularly suited to implementation in a modular form greatly simplifying the construction of a scanning device for whatever overall field of view is required. Furthermore, the modular nature of the scanning device simplifies the repair/replacement of a damaged sensor element.

Although the specific embodiment described above relates to a scanning imaging device operable at millimeter and sub-millimeter wavelengths it will be apparent that the scanning imaging device may be implemented for imaging at other wavelengths. However, implementation of the scanning imaging device of the present invention at terahertz wavelengths offers significant advantages over conventional terahertz scanning devices for which the optical elements can be complex and expensive in comparison to the scanning imaging device of the present invention and which are incapable of generating images at the resolution and speed that are achievable with the present invention. Moreover, as a result of the optics employed in the scanning imaging device described herein, the device is particularly suited to situations in which the dimensions of the object to be imaged is close to or greater than the distance of the object from the scanning imaging device for example a person standing in front of a security screen or portal. A further example is that of the automated security scanning of letter and parcels.

Further embodiments of the scanning imaging device are envisaged without departing from the scope of the invention as defined in the accompanying claims.

The invention claimed is:

1. A terahertz scanning imaging device arranged to scan a field of view, comprising:
a plurality of sensors arranged to detect terahertz radiation from a plurality of respective portions of the field of view;
a plurality of scanning elements, each element arranged to direct terahertz radiation from a respective portion of the field of view onto a corresponding sensor;
a plurality of collimators, each collimator arranged in fixed relation to a respective sensor and adapted to collimate images from a respective scanning element onto its respective sensor; and
an image processor in communication with the sensors for generating a consolidated image of the field of view.

2. The terahertz scanning imaging device of claim 1, wherein each scanning element is mounted for movement to scan across the field of view in two dimensions.

3. The terahertz scanning imaging device of claim 2, wherein each of said scanning elements is mounted for rotation about two axes to scan across the field of view in two dimensions.

4. The terahertz scanning imaging device of claim 3, wherein the two axes of rotation are coplanar.

5. The terahertz scanning imaging device of claim 1, comprising an array of imagers, each imager comprising a said scanning element and a said sensor.

6. The terahertz scanning imaging device of claim 5, wherein the image processor is adapted to generate the image of the field of view by combining a plurality of images of portions of the field of view, each image of a portion of the field of view being provided by an imager of the array of imagers.

7. A terahertz scanning imaging device as claimed in claim 1, wherein said imaging device is used for imaging an object which has a dimension which is greater than the distance of the object from the scanning imaging device.

8. A terahertz scanning imaging device as claimed in claim 1, wherein said imaging device is used for security scanning.

9. A scanning imaging device comprising a fixed array of fixed imagers and an image processor, the array of fixed imagers being in communication with the image processor for generating an image of the field of view of the scanning imaging device on the basis of image data generated by said fixed imagers, said array of fixed imagers comprising a plurality of sensors that are fixed with respect to said field of view and a respective plurality of scanning elements, each scanning element being arranged for directing radiation from a portion of said field of view to its respective sensor, each scanning element being mounted for movement in first and second directions for scanning its respective sensor across said portion of said field of view in corresponding first and second scanning directions; and a plurality of collimators, each being arranged in fixed relation to a respective sensor and being adapted to collimate images from a respective scanning element onto its respective sensor, whereby each fixed imager generates image data relating to its respective portion of said field of view.

10. A scanning imaging device as claimed in claim 9, wherein at least one of said first and second directions of movement of each scanning element comprises rotation about an axis.

11. A scanning imaging device as claimed in claim 10, further comprising a rotation drive for controlling rotation of said plurality of scanning elements.

12. A scanning imaging device as claimed in claim 11, wherein first and second rotation drives are provided to control rotation about first and second axes respectively.

13. A scanning imaging device as claimed in claim 12, wherein at least one of said first and second rotation drives is common to two or more of said scanning elements.

14. A scanning imaging device as claimed in claim 12, wherein at least one of said first and second rotation drives comprises an electric motor.

15. A scanning imaging device as claimed in claim 12, wherein at least one of said first and second rotation drives comprises a piezoelectric drive member.

16. A scanning imaging device as claimed in claim 9, wherein said first and second directions of movement of each scanning element are orthogonal.

17. A scanning imaging device as claimed in claim 9 wherein said plurality of scanning elements comprises a plurality of reflective elements.

18. A scanning imaging device as claimed in claim 17, wherein said reflective elements are plane mirrors.

19. A scanning imaging device as claimed in claim 17, wherein said reflective elements are parabolic mirrors.

20. A scanning imaging device as claimed in claim 9, wherein each of said scanning elements is adapted to scan a plurality of selectable different portions of the field of view.

21. A scanning imaging device as claimed in claim 9, wherein said plurality of collimators comprise a plurality of parabolic reflective elements.

22. A scanning imaging device as claimed in claim 9, wherein said array of fixed imagers is connected to the image processor so as to communicate image data from a plurality of the fixed imagers in parallel.

23. A scanning imaging device as claimed in claim 9, wherein adjacent fixed imagers generate image data for portions of said field of view which portions overlap along one edge.

24. A scanning imaging device as claimed in claim 9, wherein said plurality of sensors comprises at least first and second groups of sensors with each group of sensors being tuned to detect radiation at a wavelength different from the other group or groups of sensors.

25. A scanning imaging device as claimed in claim 9, wherein said plurality of sensors are tuned to detect radiation at millimeter or sub-millimeter wavelengths.

26. A scanning imaging device as claimed in claim 9, wherein said imaging device is used for imaging an object which has a dimension which is greater than the distance of the object from the scanning imaging device.

27. A scanning imaging device as claimed in claim 9, wherein said imaging device is used for security scanning.

* * * * *